(12) United States Patent
Siddle et al.

(10) Patent No.: US 6,540,884 B1
(45) Date of Patent: Apr. 1, 2003

(54) COATING GLASS

(75) Inventors: John Robert Siddle, Southport (GB); Axel Nöthe, Castrop-Rauxel (DE)

(73) Assignee: Pilkington PLC, St. Helens (GB)

( * ) Notice: Subject to any disclaimer, the term of this patent is extended or adjusted under 35 U.S.C. 154(b) by 0 days.

(21) Appl. No.: 09/365,667

(22) Filed: Aug. 2, 1999

(30) Foreign Application Priority Data

Aug. 4, 1998 (GB) ............................................ 9816922

(51) Int. Cl.⁷ ................................................ C23C 14/34
(52) U.S. Cl. ........................... 204/192.22; 204/192.12; 204/192.15
(58) Field of Search .................. 204/192.15, 192.12, 204/192.22; 427/377, 383.5

(56) References Cited

U.S. PATENT DOCUMENTS

| | | | |
|---|---|---|---|
| 4,096,026 A | 6/1978 | Takeuchi | 156/656 |
| 4,368,945 A | 1/1983 | Fujimori et al. | 350/1.7 |
| 4,421,622 A | 12/1983 | Hollars | 204/192 P |
| 4,756,811 A | 7/1988 | Takeoka et al. | 204/192.26 |
| 4,859,532 A | 8/1989 | Oyama et al. | 428/336 |
| 4,996,105 A | 2/1991 | Oyama et al. | 428/336 |
| 5,510,173 A | 4/1996 | Pass et al. | 428/216 |
| 5,837,361 A | 11/1998 | Glaser et al. | 428/216 |
| 6,231,999 B1 * | 5/2001 | Krisko | 428/627 |

FOREIGN PATENT DOCUMENTS

| | | | |
|---|---|---|---|
| DE | 43 05 414 A1 | 8/1994 | ............ C23C/14/08 |
| DE | 197 30 884 A1 | 1/1999 | ............ C23C/14/06 |
| EP | 0 303 586 A2 | 2/1989 | |
| EP | 0 303 587 A2 | 2/1989 | |
| EP | 0 371 949 A1 | 6/1990 | |
| EP | 0 410 952 A2 | 1/1991 | |
| EP | 0 773 197 A1 | 11/1995 | |
| EP | 0 801 145 A1 | 10/1997 | ............ C23C/14/06 |
| GB | 2 057 355 B | 4/1981 | ............ B32B/17/10 |
| GB | 2 129 831 A | 5/1984 | ............ C23C/15/00 |

OTHER PUBLICATIONS

JP 54 127 598 Abstract from the EPO's Web Site.
DE 1 97 30884 Abstract from EPO's Web Site.

* cited by examiner

Primary Examiner—Steven H. VerSteeg
(74) Attorney, Agent, or Firm—Marshall & Melhorn

(57) ABSTRACT

A process for the production of a low emissivity coating on a glass substrate comprising, in sequence, depositing a reflective metal layer, and reactively sputtering a metal oxide layer over the metal layer in the presence of an oxygen scavenger. The oxygen scavenger is preferably a hydrocarbon, in particular methane. The metal oxide layer may comprise tin oxide, zinc oxide, tungsten oxide and other metal oxides are also likely to be suitable.

13 Claims, 1 Drawing Sheet

COATING GLASS

FIELD OF THE INVENTION

This invention relates to a process for making coated glass. In particular this invention relates to a process for making infra-red reflecting glass and the resulting infra-red reflecting glass.

DESCRIPTION OF THE PRIOR ART

There is an increasing demand in both the architectural and transport markets for glazings that have heat-insulating properties. The heat insulation of glazing panes may be improved by coating them with infra red reflecting coatings, also known as low emissivity coatings. Low emissivity coated panes have normal emissivities of about 0.2 or less, but lower emissivities are preferable, especially 0.1 or less. Normal emissivity ($\epsilon_N$) and the U value (which is a measure of the insulation of a glazing) are defined in International Standard ISO 12092: 1994 (F), Annex A, normal emissivity being $\epsilon_N=1-R_N$, where $R_N$ is the normal reflectance at 283 K for wavelengths 5.5 $\mu$m to 50 $\mu$m.

Low emissivity coated glasses may comprise a coating stack incorporating at least one reflective metal layer (for example, of aluminium, copper, gold or preferably silver) sandwiched between anti-reflection layers of, for example, oxides of tin, zinc or titanium, silicon nitride or zinc sulphide. Coatings such as these are electrically conductive, the emissivity and resistance of the coatings being related in that an increase in resistance is usually associated with an increase in its emissivity, a more conductive coating having a better infra-red reflectivity.

To produce reflective metal low emissivity coatings on a large scale it is advantageous to use a process allowing a high deposition rate, for example, sputtering. For metal oxide anti-reflection layers, the highest deposition rates tend to be achieved by reactive sputtering from an electrically conductive (usually metallic) target in an atmosphere containing oxygen or an oxidising gas. During the sputtering process the oxygen component of the coating atmosphere is incorporated in the coating resulting in the deposition of a metal oxide coating. Unfortunately, when attempts are made to produce a coating comprising a metal oxide layer on top of, for example, a silver reflective metal layer by a reactive sputtering process in the presence of oxygen, the reflective metal layer can react with the oxygen resulting in loss of the low emissivity properties of the reflective metal layer. The reaction is not thought to be a simple oxidation because it may also involve agglomeration in the reflective metal layer.

The problem of oxidation of silver layers during overcoating with metal oxides by reactive sputtering in an oxidising atmosphere is described in United Kingdom patent application 2 129 831A. GB 2 129 831A also describes how this problem may be overcome by sputtering a small proportion of a metal other than silver before the metal oxide layer so that the additional metal lies predominantly over or in the upper part of the silver layer. The specification describes a process for the production of a low emissivity coating on a transparent substrate by cathode sputtering comprising, in sequence, sputtering a layer of silver from 5 to 30 nm thick, sputtering an additional metal other than silver in an amount equivalent to a layer 0.5 nm to 10 nm thick on to the silver layer and reactively sputtering, in the presence of an oxidising gas, an anti-reflection metal oxide layer over the silver and additional metal. In European patent specification EP 0 543 077B the problem of oxidation of a reflective metal layer during reactive sputtering of metal oxides is similarly addressed by deposition of a barrier layer. The barrier layer comprises a first sub-layer of platinum or palladium with a thickness in the range 0.2 to 0.5 nm adjacent to a silver or copper layer (the reflective metal layer) and a second sub-layer composed of titanium and/or chromium or an alloy with a thickness in the range 0.5 to 5.0 nm. The barrier layer is overcoated with a tin/ytterbium oxide layer deposited by reactive sputtering in an argon-oxygen atmosphere. Coatings on glass substrates prepared by sputtering and having layers of silver and a metal oxide are not usually stable to heating in air. The coating can lose its properties of low sheet resistance (and hence low emissivity) when the coated glass is subjected to a thermal cycle required for bending or toughening the glass.

SUMMARY OF THE INVENTION

We have discovered that the problem of oxidation of a reflective metal layer during reactive sputtering of a metal oxide may be alleviated in accordance with the present invention by depositing the metal oxide in an atmosphere containing an oxygen scavenger. We have also discovered that coated glasses produced in such a way are less prone to losing their properties of low sheet resistance (and hence low emissivity) when subjected to heating.

According to an aspect of the invention there is provided a process for the production of an electrically conductive low emissivity coating on a glass substrate comprising, in sequence, (a) depositing a reflective metal layer and (b) depositing a metal oxide layer over the metal layer by reactive sputtering in the presence of an oxygen scavenger.

This is advantageous because fewer layers (i.e. no additional protective layer or layers) are required to be deposited than in the prior art processes.

The reactive sputtering is carried out, as is understood in the art, in the presence of oxygen or an oxidising gas, which reacts to form the metal oxide layer. Thus, preferably the metal oxide layer is reactively sputtered in an atmosphere containing the oxygen scavenger and an oxidising gas. Usually, the oxidising gas is oxygen.

The oxygen scavenger is advantageously a hydrocarbon, preferably a $C_1$ to $C_4$ hydrocarbon. More preferably the oxygen scavenger is an alkane, especially a $C_1$ to $C_4$ alkane, most preferably the oxygen scavenger is methane.

The invention enables the overlying metal oxide layer to be sputtered at an increased rate (as compared to the rate which can be achieved in the absence of the oxygen scavenger) while maintaining a required low emissivity (i.e. a normal emissivity of 0.2 or less).

The metal oxide may comprise tin oxide, zinc oxide or, preferably, tungsten oxide. Other metal oxides likely to be suitable include transition metal oxides, for example, tungsten oxide, nickel oxide, molybdenum oxide, manganese oxide, zirconium oxide, vanadium oxide, niobium oxide, tantalum oxide, and mixed oxides comprising these metal oxides. Cerium or titanium oxide may also be suitable. Some metal oxides (for example tungsten oxide) may be partially reduced during deposition of the metal oxide layer in the presence of an oxygen scavenger, such partial reduction may change the optical properties of the metal oxide layer.

The reflective metal layer will normally comprise a silver layer. This is advantageous because silver layers are highly reflective in the infra-red region of the spectrum, have a neutrally coloured visible reflection and are easily deposited by sputtering, or other vacuum deposition methods.

Low emissivity coatings comprising reflective metal layers produced by a process according to the invention will normally undergo an increase of sheet resistance on overcoating with the metal oxide layer of less than 25%, and preferably less than 20%. Usually, the coatings produced by a process according to the invention will have a sheet resistance after overcoating with the metal oxide layer of below 12 Ω/square. This is advantageous because sheet resistances below 12 Ω/square indicate that the coating and, therefore, the coated glass, has low emissivity acceptable for commercial purposes.

A particular advantage of the present invention is that coated glasses produced by the process according to the invention are less prone to degradation after heat treatment in an oxidising atmosphere (usually of air). Such heat treatment is necessary, for example, to shape or toughen glass.

Thus, in a preferred embodiment of the invention, after depositing the reflective metal layer and the metal oxide layer, the process additionally comprises heat treating the coated glass substrate in an atmosphere containing oxygen.

Preferably, the sheet resistance of the coating is below 30 Ω/square after the glass has been overcoated with the metal oxide layer and then heat treated in an atmosphere containing oxygen. Sheet resistance of below 30 Ω/square after heat treatment indicates that the reflective metal layer, although partially oxidized, is not completely oxidized, but preferably the sheet resistance would be lower, and more preferably about the same as before heat treatment. The coated glass would be heat treated if it is desired to shape and/or toughen the glass after coating. The heat treatment would usually involve raising the temperature of the glass to 400–720° C.

The thicknesses of the reflective metal layers in coated glasses produced by a process according to the invention will normally be in the range 8 to 18 nm. Thicknesses below 8 nm may result in too high an emissivity (i.e. too little infra red reflection), above 18 nm there may be high visible light absorption by the reflective metal layer.

If it is desired to produce coated glasses having very low emissivity or having solar control (i.e. lower total solar heat transmission) properties more than one reflective metal layer may be deposited sandwiched between anti-reflection layers, (i.e. the coating may comprise 2n+1, anti-reflection and reflective metal layers, where n is an integer greater than or equal to one).

If it is desired to produce a toughenable coated glass (i.e. protected from degradation during heat treatment or ageing), the coating stack may comprise an additional protective layer disposed between the reflective metal layer and the overcoating metal oxide layer. Useful protective layers include zinc, titanium, nickel, palladium, platinum or preferably a nickel chromium alloy.

Coated glass according to this invention may be used in many areas of glass use including in laminated glass comprising a coated glass according to the invention, a polymer interlayer and a second glass and in multiple glazing units having a first pane of a coated glass in spaced opposed relation to a second glass.

In another aspect, the present invention also provides a low emissivity coated glass comprising a glass substrate and a coating stack deposited directly on the substrate said coating stack comprising a silver layer and at least one tungsten oxide layer over said silver layer.

DETAILED DESCRIPTION OF THE PREFERRED EMBODIMENTS OF THE INVENTION

The following diagrammatic drawings (not to scale) illustrate coated glasses which may be produced by the process of the invention.

Figure 1:
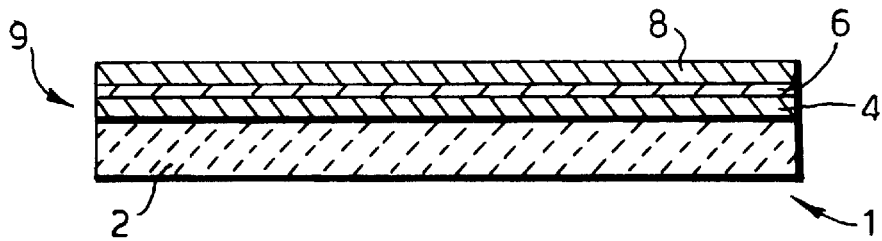
FIG. 1 illustrates a section through a coated glass produced by a process in accordance with one embodiment of the invention.

Referring to FIG. 1, a low emissivity coated glass 1 comprises a glass substrate 2, and a coating 9 comprising a first anti-reflection layer of metal oxide 4, a silver layer 6 to provide infra red reflecting properties (low emissivity) and a second anti-reflection layer of a metal oxide 8. The metal oxide layers 4 and 8 comprise tin oxide, zinc oxide or tungsten oxide, and the second anti-reflection layer of a metal oxide 8 is deposited by reactive sputtering in the presence of methane.

Figure 2:
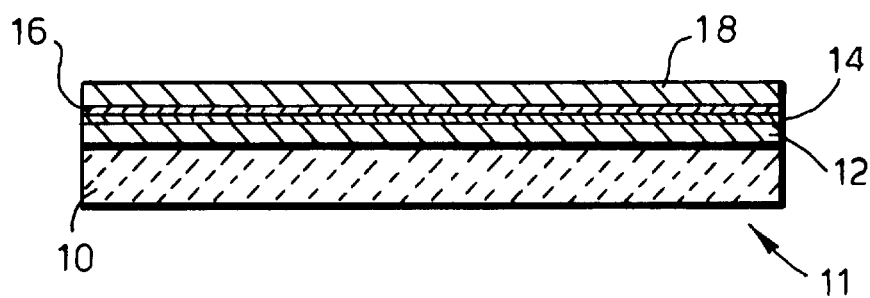
FIG. 2 illustrates a section through a coated glass produced by a process in accordance with a second embodiment of the invention.

FIG. 2 illustrates a similar coated glass to that illustrated in FIG. 1. A coated glass 11 comprises a glass substrate 10 and a coating comprising a first anti-reflection layer of a metal oxide 12, a silver layer 14 to provide infra red reflecting (low emissivity) properties, a protective layer 16 of nichrome to protect the silver layer 14 from degradation during ageing, weathering or heat treatment, and a second anti-reflection layer of a metal oxide 18 deposited by reactive sputtering in the presence of methane. The metal oxide layers 12 and 18 comprise tin oxide, zinc oxide or tungsten oxide.

Figure 3:
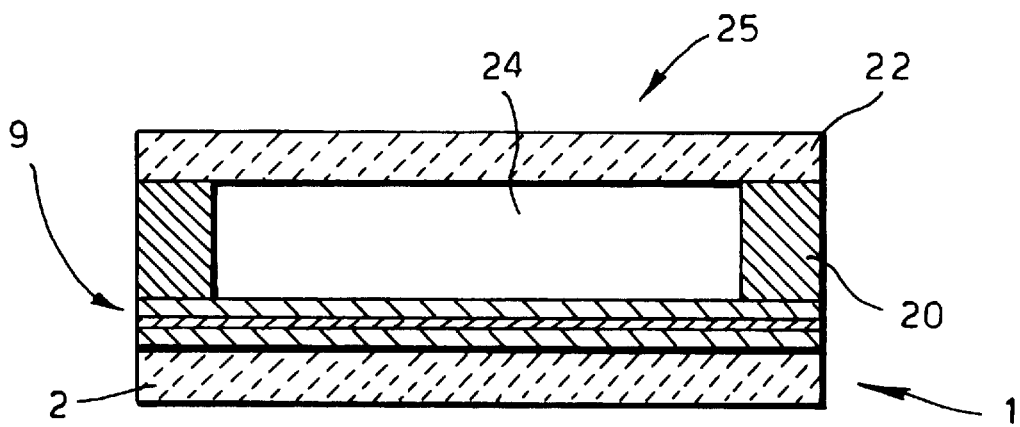
FIG. 3 illustrates a section through a double glazing unit incorporating a coated glass as illustrated in FIG. 1.

FIG. 3 illustrates a coated glass pane of FIG. 1 assembled in spaced opposed relationship with a second pane of glazing material 22, the panes being spaced apart and sealed by a spacing and sealing system 20 to form double glazing unit 25 having an air space 24. The coating 9 faces the air space 24.

The invention is illustrated but not limited by the following Examples in which all coatings were deposited by DC magnetron sputtering. Metal oxide layers were deposited by reactive sputtering in an oxygen containing atmosphere.

Examples 1 and 2 and Comparative Example

In Examples 1 and 2 and in the Comparative Example coatings were deposited on float glass substrates by sputtering. The coatings comprised a first anti-reflection layer of a metal oxide, a silver layer and a second anti-reflection layer of a metal oxide. The metal oxides of the anti-reflection layers in Examples 1 and 2 and the Comparative Example were tin oxide or zinc oxide and are described in Table 1 together with the thickness of the layers of the coatings for the Examples and Comparative Example, and the components of the sputtering atmosphere for the deposition of each layer. The second anti-reflection layer of metal oxide was deposited in the presence of methane in Examples 1 and 2 and with no methane present in the Comparative Example. The light transmission, sheet resistance and normal emissivity of the coated glasses were determined by standard methods well known in the art, and are shown in Table 2. The sheet resistance of the coated glass in the Comparative Example was too high to measure, indicating degradation of the silver layer.

TABLE 1

| | Example 1 | Example 2 | Comparative Example |
|---|---|---|---|
| First Anti-Reflection Layer | | | |
| Metal Oxide | Tin Oxide | Zinc Oxide | Tin Oxide |
| Thickness/nm | 37 | 37 | 37 |
| Sputtering Atmosphere pressure/mbar | | | |
| Ar | $1 \times 10^{-3}$ | $1 \times 10^{-3}$ | $1.0 \times 10^{-3}$ |
| $O_2$ | $1.5 \times 10^{-3}$ | $1.8 \times 10^{-3}$ | $1.5 \times 10^{-3}$ |
| Silver Layer | | | |
| Thickness/nm | 9 | 9 | 9 |
| Sputtering Atmosphere pressure/mbar | | | |
| Ar | $2 \times 10^{-3}$ | $2 \times 10^{-3}$ | $2 \times 10^{-3}$ |
| Second Anti-Reflection Layer | | | |
| Metal Oxide | Tin Oxide | Zinc Oxide | Tin Oxide |
| Thickness/nm | 37 | 37 | 37 |
| Sputtering Atmosphere pressure/mbar | | | |
| Ar | $1 \times 10^{-3}$ | $1 \times 10^{-3}$ | $1 \times 10^{-3}$ |
| $O_2$ | $2 \times 10^{-3}$ | $2.2 \times 10^{-3}$ | $1.5 \times 10^{-3}$ |
| $CH_4$ | $1.5 \times 10^{-3}$ | $1.5 \times 10^{-3}$ | — |

TABLE 2

| | Example 1 | Example 2 | Comparative Example |
|---|---|---|---|
| Light Transmission (%) | 85 | 86 | 55 |
| Sheet Resistance (Ω/square) | 8.5 | 7.3 | — |
| Normal Emissivity | 0.09 | 0.07 | 0.89 |

Examples 3 and 4

In these Examples, samples were optically analysed using a Hitachi U-4000 spectrophotometer over the wavelength range 300–2600 nm and a Perkin Elmer 883 spectrophotometer and values for the normal and/or the hemispherical emissivities ($\epsilon_N$ and $\epsilon_H$) were calculated. The optical characteristics and total solar heat transmission (TSHT), U values and reflection and transmission CIE Lab colours were calculated in accordance with International Standard ISO 10292, and well known methods in the glass art.

Optical constants (refractive index, n and extinction coefficient, k) were obtained from the spectra and some spectra modelled in order to determine individual layer thicknesses. The layer thickness of some coated samples were measured using a Sloan Dektak IIID profilometer. The sheet resistance values were obtained using for example a Delcom Instruments Model 717B non-contact conductance monitor or a standard in-line 4-point probe. The double-glazed optical properties were calculated for a unit with the coating stack on surface 3 (outer side of inner pane), a 16 mm argon filled gap and 4 mm clear float glass as the outer pane.

In Example 3 a coated glass was prepared using four target electrodes of size 400 mm×100 mm powered by an Advanced Energy 5 kW MDX Magnetron supply and using a silver target and a sub-stoichiometric tungsten oxide target. The power was limited to 1 kW and below. The coating layers were deposited on a substrate at ambient temperature, the substrate being 2 mm thick float glass cleaned using household glass cleaner and lint free cloths. No attempt was made to differentiate between the tin and non-tin side of the substrate.

The coated glass comprised a coating stack of the form tungsten oxide/silver/tungsten oxide, the second anti-reflection layer of tungsten oxide being deposited at $2\times10^{-3}$ m bar in an $Ar/O_2/CH_4$ sputtering gas composition with flow rates of 15 $cm^3min^{-1}$, 40 $cm^3min^{-1}$ and 11 $cm^3min^{-1}$ of argon, oxygen and methane respectively (all standard volumes). The first anti-reflection layer of tungsten oxide was deposited under similar conditions but without methane present. The silver layer of the coating was about 13.3 nm and the tungsten oxide layers were each approximately 37 nm thick. The sheet resistance of the as-deposited silver layer was 3.90 Ω/sq before overcoating. Sheet resistance and hemispherical emissivity of the coated glass are described in Table 3 together with optical constants for the coated glass in a double glazing unit. The sheet resistance of the coating increased by less than 20% on overcoating.

In Table 4 optical constants n and k of the second anti-reflection tungsten oxide layer produced according to Example 3 at wavelengths 500–600 nm are shown and compared to a typical stoichiometric tungsten oxide layer prepared without methane in the sputtering gas mixture. The higher k values of the Example 3 coating show that there is slight light absorption in the second layer suggesting that the layer is partially reduced.

TABLE 3

| Sheet Resistance | 4.6Ω/sq. |
|---|---|
| Hemispherical Emissivity | 0.062 |
| Visible Transmission (%) | 78.0 |
| Visible Reflection (%) | 11.3 |
| TSHT (%) | 61.3 |
| U-Value | 1.17 |
| Transmission Colour (L*, a*, b*) | 90.7, −2.7, 3.54 |
| Film Side Reflection Colour (L*, a*, b*) | 40.2, 2.86, −6.7 |

TABLE 4

| Wavelength/ | Optical Constants of Tungsten Oxide Layer (Example 3) | | Typical Optical Constants for Stoichiometric Tungsten Oxide layer | |
|---|---|---|---|---|
| nm | n | k | n | k |
| 500 | 2.12 | 0.03 | 2.19 | 0.01 |
| 510 | 2.11 | 0.03 | 2.18 | 0.01 |
| 520 | 2.1 | 0.03 | 2.17 | 0.01 |
| 530 | 2.09 | 0.04 | 2.17 | 0.01 |
| 540 | 2.09 | 0.04 | 2.16 | 0 |
| 550 | 2.08 | 0.04 | 2.16 | 0 |
| 560 | 2.07 | 0.05 | 2.15 | 0 |
| 570 | 2.07 | 0.05 | 2.15 | 0 |
| 580 | 2.06 | 0.05 | 2.15 | 0 |
| 590 | 2.06 | 0.06 | 2.14 | 0 |
| 600 | 2.06 | 0.06 | 2.14 | 0 |

In Example 4, a coated glass was prepared using target electrodes of 380 mm by 102 mm, metallic silver and metallic tungsten targets, and target power of 800 W. The coating layers were deposited on a substrate at ambient temperature, the substrate being 2 mm thick float glass. The glass traversal speed was 670 mm $min^{-1}$.

The coated glass comprised a coating stack of the form tungsten oxide/silver/tungsten oxide, the second (top) anti-reflection layer of tungsten oxide being deposited at $2 \times 10^{-3}$ mbar in an Ar/O$_2$/CH$_4$ sputtering gas composition with flow rates of 15 cm$^3$min$^{-1}$, 40 cm$^3$ min$^{-1}$ and 8 cm$^3$min$^{-1}$ of argon, oxygen and methane respectively (all standard volumes). The first anti-reflection layer of tungsten oxide was deposited similarly but with no methane present. The silver layer of the coating was about 9 nm thick, the first anti-reflection layer of tungsten oxide was about 37 mn thick and the second anti-reflection layer of tungsten oxide was about 40 nm thick. The coated glass was heat treated by placing it in a furnace held at 630° C. for a dwell time of 90 seconds (air ambient) to simulate toughening conditions.

Normal emissivity and sheet resistance of the coated glass before and after deposition of the second anti-reflection layer of tungsten oxide, together with sheet resistance after heat treatment are described in Table 5. The sheet resistance increased less than 25% on overcoating.

TABLE 5

| | | |
|---|---|---|
| Normal emissivity before heat treatment | 0.055 | |
| Sheet resistance before deposition of second WO$_3$ layer | 4.5 | Ω/sq |
| Sheet resistance after deposition of second WO$_3$ layer | 5.5 | Ω/sq |
| Sheet resistance after heat treatment | 30 | Ω/sq |

What is claimed is:

1. A process for the production of an electrically conductive low emissivity coating on a glass substrate, comprising, in sequence:
   (a) providing a glass substrate having at least one surface;
   (b) depositing a reflective metal layer above a surface of the glass substrate;
   (c) providing an atmosphere for reactive sputtering of a metal oxide, said atmosphere containing methane as an oxygen scavenger; and
   (d) depositing a metal oxide layer over the reflective metal layer by reactive sputtering in said atmosphere.

2. A process according to claim 1 wherein the atmosphere in which the metal oxide layer is reactively sputtered further contains an oxidizing gas.

3. A process according to claim 2 wherein the oxidizing gas is oxygen.

4. A process according to claim 1 wherein the metal oxide layer comprises tin oxide, zinc oxide or tungsten oxide.

5. A process according to claim 1 wherein the reflective metal layer is a silver layer.

6. A process according to claim 1 wherein the coating has a sheet resistance, the sheet resistance of the coating increases by less than 25% on overcoating with the metal oxide layer.

7. A process according to claim 1 wherein the coating has a sheet resistance, the sheet resistance of the coating increases by less than 20% on overcoating with the metal oxide layer.

8. A process according to claim 1 wherein the coating has a sheet resistance, the sheet resistance of the coating is below 12 Ω/square after overcoating with the metal oxide layer.

9. A process to claim 1 wherein the process additionally comprises heat treating the coated glass substrate in an atmosphere containing oxygen.

10. A process according to claim 9 wherein the coating has a sheet resistance, the sheet resistance of the coating is below 30 Ω/square after the glass has been overcoated with the metal oxide layer and then heat-treated in an atmosphere containing oxygen.

11. A process according to claim 1 wherein the reflective metal layer has a thickness in the range 8–18 nm.

12. A process according to claim 1 wherein the coating has more than one reflective metal layer.

13. A process according to claim 1 wherein the process comprises an additional step of depositing a protective layer between the reflective metal layer and the metal oxide layer.

* * * * *